United States Patent [19]
Hashimoto

[11] Patent Number: 6,108,289
[45] Date of Patent: Aug. 22, 2000

[54] OPTICAL DISC RECORDING APPARATUS FOR OVERWRITING INFORMATION ON A PREVIOUSLY RECORDED PACKET OF AN OPTICAL DISC

[75] Inventor: Hirokuni Hashimoto, Kanagawa, Japan

[73] Assignee: Ricoh Company, Ltd., Tokyo, Japan

[21] Appl. No.: 09/064,053

[22] Filed: Apr. 22, 1998

[30] Foreign Application Priority Data

Apr. 23, 1997 [JP] Japan ................................. 9-105993

[51] Int. Cl.⁷ ........................................... G11B 7/00
[52] U.S. Cl. ............................................... 369/59
[58] Field of Search .............................. 369/58, 54, 60, 369/48, 47, 84, 32

[56] References Cited

U.S. PATENT DOCUMENTS

| | | | |
|---|---|---|---|
| 5,343,455 | 8/1994 | Takeuchi et al. | 368/59 |
| 5,513,166 | 4/1996 | Tokumitsu et al. | |
| 5,706,271 | 1/1998 | Hashimoto. | |
| 5,774,434 | 6/1998 | Arataki et al. | 369/58 |
| 5,878,010 | 3/1999 | Okamoto et al. | 369/58 |
| 5,883,869 | 3/1999 | Tamai et al. | 369/58 |
| 5,995,471 | 11/1999 | Saoyama et al. | 369/84 |

FOREIGN PATENT DOCUMENTS

| | | |
|---|---|---|
| 5-12669 | 1/1993 | Japan. |
| 5-143997 | 6/1993 | Japan. |

*Primary Examiner*—Nabil Hindi
*Attorney, Agent, or Firm*—Dickstein Shapiro Morin & Oshinsky LLP

[57] ABSTRACT

An optical disc recording apparatus which can record information, which is provided in a packet having a fixed length, on an optical disc on an individual user data block by using the fixed packet write method. A plurality of tracks having a plurality of packets are formed on a recording area of the optical disc. Each of the packets has the same number of user data blocks. Information is recorded at once on an individual packet basis. A buffer stores new recording information to be recorded on the optical disc. A controller controls a recording operation of the new recording information on the optical disc so that, when a recording area of the new recording information is totally included in a previously recorded packet, previously recorded information recorded in the previously recorded packet is read and stored in the buffer. The previously recorded information stored in the buffer is overwritten by the new recording information. Then, the new recording information in the buffer is recorded in the previously recorded packet.

4 Claims, 7 Drawing Sheets

OPTICAL DISC RECORDING APPARATUS FOR OVERWRITING INFORMATION ON A PREVIOUSLY RECORDED PACKET OF AN OPTICAL DISC

BACKGROUND OF THE INVENTION

1. Field of the Invention

The present invention generally relates to an optical disc recording apparatus and, more particularly, to an optical disc recording apparatus which records information on a rewritable optical disc such as a CD-RW.

2. Description of the Related Art

A minimum unit for reproduction of information recorded on a recording area of an optical disc such as a compact disc (CD), a recordable optical disc (CD-R) or a rewritable optical disc (CD-RW) is defined as a block of a recording area. Each block can contain information of about 2,048 to 2,352 bytes.

A minimum unit for recording information on an optical disc such as a CD-R or a CD-RW is defined as a packet. Each packet comprises at least one user data block, five link blocks preceding the user data block and two link blocks subsequent to the user data block. The five link blocks preceding the user data block include one link block and four run-in blocks. The two link blocks subsequent to the user data block include two run-out blocks.

As specified in the Orange Book, the link blocks are required for interconnecting a plurality of packets when information is recorded on an optical disc. The link block does not contain user data. It should be noted that a rule for recording data on an optical disc is referred to as a "linking rule".

There are two methods for recording data on an optical disc such as a CD-R (may be referred to as a "recordable compact disc") or a CD-RW (may be referred to as a "rewritable compact disc"). One of the methods is referred to as a "track at-once method" and the other is referred to as a "packet write method".

The track at-once method is for recording information on a track all at one time by using a single packet. The user data blocks in the track are consecutive, and there are no link block between the user data blocks. A single track constitutes a recording unit, and ninety-nine tracks can be formed on the optical disc at maximum. A start address and an end address of each track are recorded on a separate area of the optical disc as a "table of contents (TOC)".

On the other hand, the packet write method is for recording information on a track by dividing the track into a plurality of packets so that the information is recorded on an individual packet basis. Since this method records information by each individual packet, each user data block is discretely located in a single track and link blocks are provided between adjacent ones of user data blocks.

The packet write method is classified into two types, that is, a "fixed packet write method" and a "variable packet write method". In the fixed packet write method, a number of user data blocks within a track is set to a fixed number. The number of user data blocks within a packet is referred to as a packet length or packet size. On the other hand, in the variable packet write method, packets having various packet lengths are provided in a single track.

Additionally, an address (hereinafter referred to as a physical address) is assigned to each block on an optical disc in an ascending order starting from zero "0". The physical address can be accessed by an address (hereinafter referred to as a logical address) which is logically converted from the physical address.

In the variable packet write method, the physical address is linearly related to the logical address, such that the logical address is also assigned to each link block. Accordingly, there exists logical addresses which cannot be accessed.

On the other hand, in the fixed packet write method, the logical address is assigned to only a user data block. That is, each link block is not provided with the physical address so that the physical address is provided to each user data block in a consecutively ascending order. Thus, a physical address of a user data block located at the beginning of a track conforms to the logical address. Accordingly, there is an advantage in that the logical address space is continuous, and information recorded on an optical disc can be reproduced without considering the packet structure of the data to be reproduced.

However, in the above-mentioned fixed packet write method, information must be recorded by a packet having a previously fixed length. That is, a start address and an end address of each packet must conform to a start address and an end address of information to be recorded, respectively. Accordingly, when information to be recorded has a length shorter than a length of each packet, fill data must be added to the information so as to adjust the length of the information to be equal to the length of the entire packet.

Accordingly, when information having a short length is frequently overwritten on a rewritable optical disc by the fixed packet write method, a large amount of meaningless data is recorded on a recording area. Thus, there is a problem in that a large part of the recording area which is provided for recording the user data is wasted, resulting in an inefficient use of the recording area of the optical disc.

SUMMARY OF THE INVENTION

It is a general object of the present invention to provide an improved and useful optical disc recording apparatus in which the above-mentioned problems are eliminated.

A more specific object of the present invention is to provide an optical disc recording apparatus which can record information, which is provided in a packet having a fixed length, on an optical disc by each individual user data block by using the fixed packet write method.

In order to achieve the above-mentioned objects, there is provided according to one aspect of the present invention an optical disc recording apparatus for recording information on a rewritable optical disc by using a fixed packet write method, a plurality of tracks having a plurality of packets being formed on a recording area of the optical disc, each of the packets having the same number of user data blocks, information being recorded at once on an individual packet basis, the optical disc recording apparatus comprising:

a buffer storing new recording information to be recorded on the optical disc; and a controller controlling a recording operation of the new recording information on the optical disc so that, when a recording area of the new recording information is totally included in a previously recorded packet, previously recorded information recorded in the previously recorded packet is read and stored in the buffer, the previously recorded information stored in the buffer is overwritten by the new recording information, and the new recording information in the buffer is recorded in the previously recorded packet.

According to the above-mentioned invention, the information in the packet having a fixed length can be rewritten on an individual block basis by using the fixed packet write method. Thus, the recording area of the rewritable optical disc can be efficiently used even if the information on the optical disc is frequently rewritten.

Additionally, the controller may control a recording operation of the new recording information on the optical disc so that, when a recording area of the new recording information extends over a plurality of previously recorded packets, previously recorded information recorded in the plurality of the previously recorded packets is read and stored in the buffer, the previously recorded information stored in the buffer is overwritten by the new recording information, and the new recording information in the buffer is recorded in the previously recorded packets.

Accordingly, the information extending over a plurality of packets can be rewritten on an individual block basis even when the fixed packet write method is used.

Further, the controller may control a recording operation of the new recording information on the optical disc so that, when a recording area of the new recording information extends over a plurality of previously recorded packets, previously recorded information in the previously recorded packets is read and stored in the buffer on an individual packet basis, the previously recorded information stored in the buffer is overwritten by a corresponding part of the new recording information immediately after the previously recorded information of one of the previously recorded packets is stored in the buffer, and the part of the new recording information stored in the buffer is recorded in the one of the previously recorded packets immediately after the previously recorded information of the one of the previously recorded packets is overwritten by the part of the new recording information.

Accordingly, a large amount of information exceeding a capacity of the buffer can be rewritten on an individual block basis even when the fixed packet write method is used.

The controller may control so as to directly overwrite the previously recorded information of the one of the previously recorded packets by the part of the new recording information, when the previously recorded information of the one of the previously recorded packets is totally overwritten by the part of the new recording information, so that an overwriting operation is performed on the optical disc without using the buffer.

Accordingly, when information of the entire packet is overwritten, the information is directly overwritten on the optical disc without using the buffer. Thus, a time for reading the information and storing the information in the buffer can be eliminated.

Additionally, there is provided according to another aspect of the present invention an optical disc recording apparatus for recording information on a rewritable optical disc by using a fixed packet write method, a plurality of tracks having a plurality of packets being formed on a recording area of the optical disc, each of the packets having the same number of user data blocks, information being recorded at once on an individual packet basis, the optical disc recording apparatus comprising:

a controller controlling a recording operation of new recording information on the optical disc so as to directly overwrite the previously recorded information of one of the previously recorded packets by the new recording information, when the previously recorded information of the one of the previously recorded packets is totally overwritten by the new recording information, so that an overwriting operation is performed on the optical disc.

Accordingly, when information of the entire packet is overwritten, the information is directly overwritten on the optical disc without using the buffer. Thus, a time for reading the information and storing the information in the buffer can be eliminated.

Additionally, there is provided according to another aspect of the present invention an optical disc recording apparatus for recording information on a rewritable optical disc by using a fixed packet write method, a plurality of tracks having a plurality of packets being formed on a recording area of the optical disc, each of the packets having the same number of user data blocks, information being recorded at once on an individual packet basis, the optical disc recording apparatus comprising:

a buffer storing frequently updated information recorded in a previously recorded packet;

a controller controlling a recording operation of new recording information on the optical disc so that the frequently updated information is updated by overwriting the frequently updated information in the buffer by the new recording information, and the frequently updated information in the previously recorded packet is overwritten by the frequently updated information of the buffer at a predetermined time.

According to this invention, the frequently updated information is rewritten in the buffer and is recorded on the optical disc at a predetermined time. Thus, the number of accesses to the optical disc is reduced, resulting in a reduction of a processing time. Additionally, deterioration of the recording area of the optical disc due to frequent writing operations performed on the same area can be prevented.

The frequently updated information in the previously recorded packet may be overwritten when a predetermined time has passed after the frequently recorded information of the buffer is updated. Otherwise, the frequently updated information in the previously recorded packet may be overwritten when an instruction is provided by a user.

Other objects, features and advantages of the present invention will become more apparent from the following detailed description when read in conjunction with the accompanying drawings.

DETAILED DESCRIPTION OF THE PREFERRED EMBODIMENTS

Figure 1:
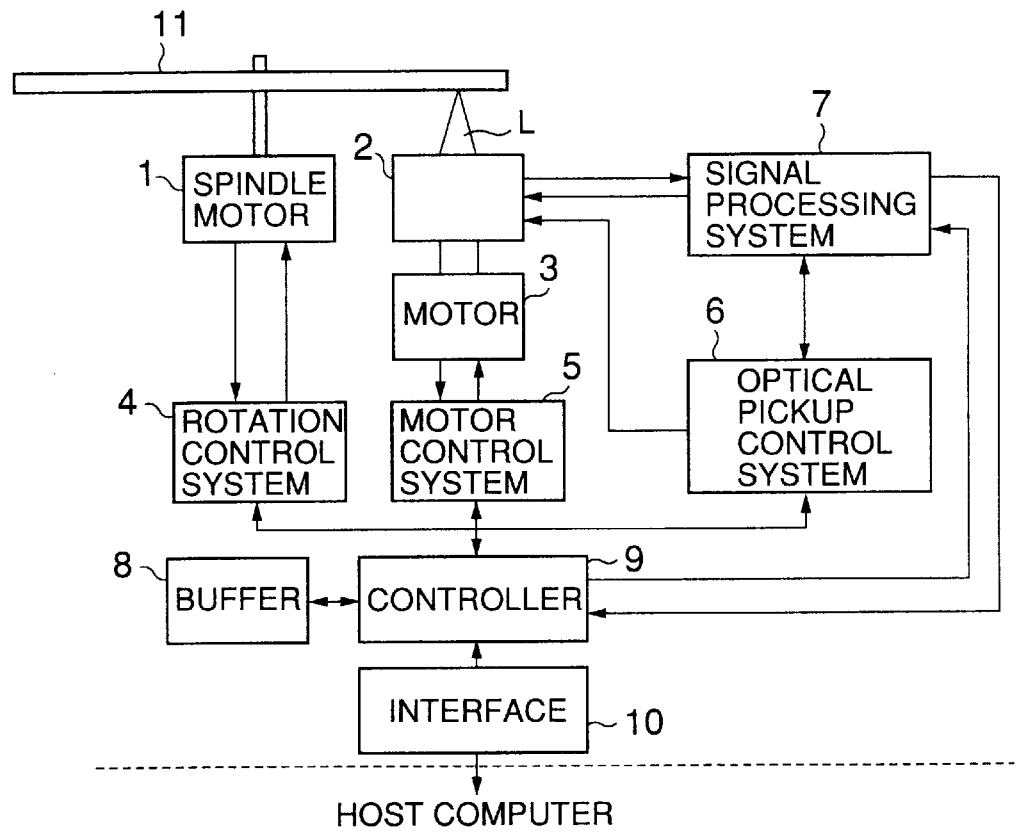
FIG. 1 is a block diagram of an optical disc recording apparatus according to a first embodiment of the present invention.

A description will now be given of a first embodiment of the present invention. FIG. 1 is a block diagram of an optical disc recording apparatus according to the first embodiment of the present invention.

The optical disc recording apparatus shown in FIG. 1 records information on an optical disc 11 such as a CD-RW by providing a train of pits spirally formed on the optical disc. The optical disc recording apparatus reads the information on the optical disc 11 by information units referred to as user data blocks. The optical disc recording apparatus according to the present embodiment uses the above-mentioned fixed packet write method to record information on the optical disc 11.

As shown in FIG. 1, the optical disc recording apparatus is provided with a spindle motor 1, an optical pickup 2 and a motor 3. The spindle motor 1 rotates the optical disc 11. The optical pickup 2 has a semiconductor laser which projects a laser beam L onto a recording area of the optical disc 11. The motor 3 moves the optical pickup 2 in a radial direction of the optical disc 11 in cooperation with a seek motor (not shown in the figure) provided in the optical pickup 2.

The optical disc recording apparatus further includes a rotation control system 4, a motor control system 5, an optical pickup control system 6 and a signal processing system 7. The rotation control system 4 controls operation of the spindle motor 1. The motor control system 5 controls operation of the motor 3. The optical pickup control system 6 controls operation of the optical pickup 2. The signal processing system 7 transmits information read by the optical pickup 2 and receives information to be recorded on the optical disc 11 by the optical pickup 2.

The optical disc recording apparatus is further provided with a buffer 8, a controller 9 and an interface 10. The buffer 8 is used as a memory area in which recorded information which is read from the optical disc 11 is overwritten by new information received from an external host computer (not shown in the figure). The controller 9 controls the above-mentioned rotation control system 4, the motor control system 5, the optical pickup control system 6 and the processing system 7. The interface 10 enables communication with the external host computer.

In the thus constructed optical disc recording apparatus, the optical pickup 2 is moved in the radial direction of the optical disc 11 while the optical disc 11 is rotated by the spindle motor 1 so as to record or read information by projecting the laser beam L from the semiconductor laser of the optical pickup 2 onto the recording area of the optical disc 11.

Figure 2:
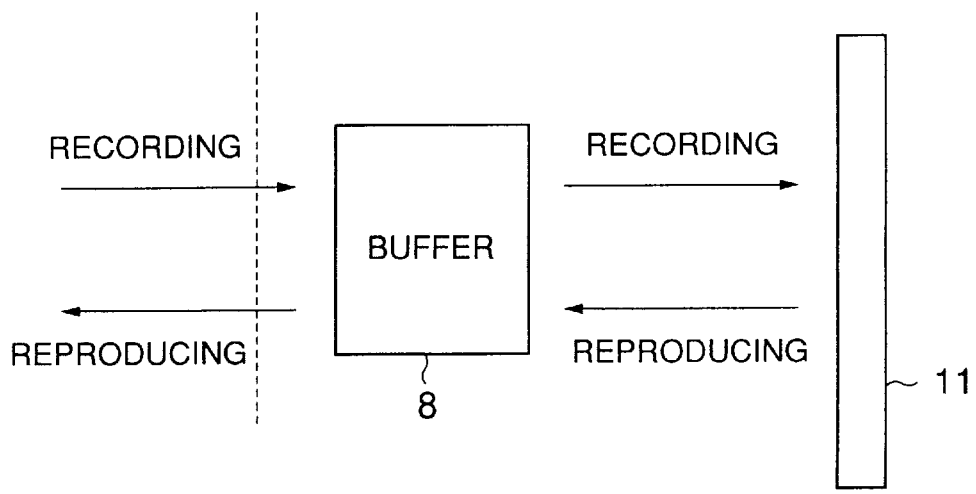
FIG. 2 is an illustration for explaining a function of a buffer shown in FIG. 1.

FIG. 2 is an illustration for explaining a function of the buffer 8 provided in the optical disc recording apparatus shown in FIG. 1.

When the optical disc recording apparatus shown in FIG. 1 reproduces information recorded on the optical disc 11, the controller moves the optical pickup 2 while the optical disc 11 is rotated. The laser beam L is projected from the optical pickup 2 onto the recording area of the optical disc 11 at a reproducing power level so as to read the information recorded on the optical disc 11. The reproduced information is temporarily stored in the buffer 8. Thereafter, the information in the buffer 8 is transferred to the host computer via the interface 10.

On the other hand, when the optical disc recording apparatus records information on the optical disc 11, the controller 9 controls the buffer 8 to store new information to be recorded on the optical disc 11, the new information being received from the external host computer via the interface 10. Then, the laser beam L is projected from the optical pickup 2 onto the recording area of the optical disc 11 at a recording power level so as to record the new information stored in the buffer 8 on the optical disc 11 by the fixed packet write method.

The controller 9 controls a recording process according to the present invention when information is recorded on a previously recorded recording area of the optical disc 11. In this recording process, new information is overwritten on the previously recorded information by using the buffer 8.

More specifically, a plurality of tracks are formed on the recording area of the rewritable optical disc 11. Each of the tracks is divided into a plurality of packets so that a number of the user data blocks in each of the packets is the same. Thus, a recording can be performed by the fixed packet write method in which information can be recorded in each packet at once. This operation is controlled by the controller 9.

Additionally, when recording new information on the optical disc 11, the controller 9 may determine whether or not the recording area in which the new information is to be recorded is included in a previously recorded packet. If the new information can be included in the previously recorded packet, the previously recorded information is read and stored in the buffer 8. Then, the previously recorded information in the buffer 8 is overwritten by the new information to be recorded. Thereafter, the new information in the buffer 8 is recorded in the previously recorded packet.

Further, when recording new information on the optical disc 11, the controller 9 may determine whether or not the recording area in which the new information is to be recorded extends over a plurality of previously recorded packets. If the new information extends over the plurality of previously recorded packets, the previously recorded information in each of the packets is read and stored in the buffer 8. Then, the previously recorded information in the buffer 8 is overwritten by the new information to be recorded. Thereafter, the new information in the buffer 8 is recorded in the previously recorded packets.

Additionally, when recording new information on the optical disc 11, the controller 9 may determine whether or not the recording area in which the new information is to be recorded extends over a plurality of previously recorded packets. If the new information extends over the plurality of previously recorded packets, the previously recorded information in each of the packets is sequentially read on an individual packet basis and stored in the buffer 8. The new information is divided into a plurality of parts each corresponding to a single packet. The previously recorded information stored in the buffer 8 is overwritten by the new information to be recorded each time the new information corresponding to a single packet is stored in the buffer 8. The part of new information in the buffer 8 is recorded in the corresponding previously recorded packet.

Further, when recording new information on the optical disc 11, the controller 9 may determine whether or not the new information to be recorded is to be overwritten on the entire previously recorded information in the previously recorded packets. If it is determined that the new information should be overwritten on the entire previously recorded information, the previously recorded information is directly overwritten by the new information.

Additionally, the controller 9 may control the buffer 8 to hold information for a packet which is frequently overwritten so as to update the information in the buffer 8. The information in the buffer 8 is recorded on the optical disc after a predetermined time period has passed or when such an instruction is provided by a user.

Figure 3:
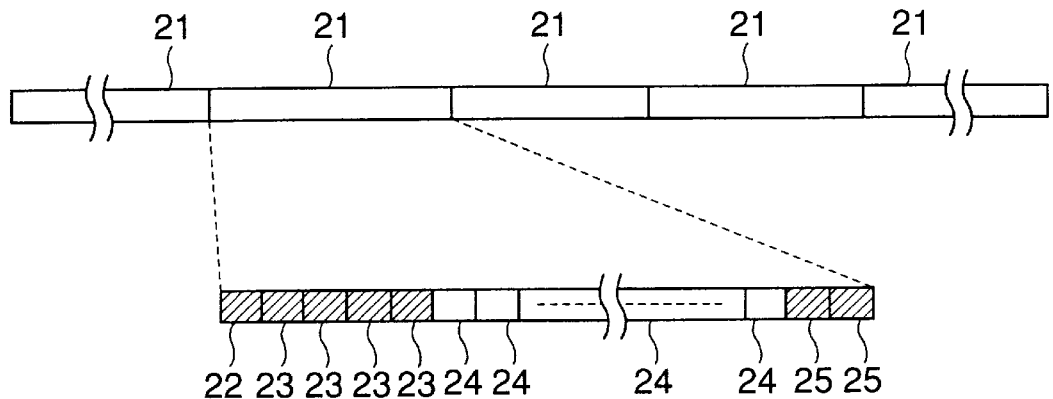
FIG. 3 is an illustration for explaining a track and a format of a packet used in a fixed packet write method.

A description will now be given of the fixed packet write method used by the optical disc recording apparatus shown in FIG. 1. A description will also be given of a format of a packet used in the fixed packet write method. FIG. 3 is an illustration of a recording area of the optical disc 11 for explaining the track and the format of the packet used in the fixed packet write method.

According to the fixed packet write method, a plurality of tracks are formed in a recording area of the optical disc 11. Each of the tracks is divided into a plurality of packets each having the same number of user data blocks so that information is recorded for each individual packet at once.

Accordingly, in the fixed packet write method, each of the packets 21 in a single track in the recording area of the optical disc 11 has the same packet length, and each of the packets 21 has the same number of the user data blocks.

The detail of the packet is specified in the Orange Book Part II, version 2.0, and a description thereof will be omitted.

The packet 21 includes a plurality of user data blocks 24 which can be reproduced. Additionally, the packet 21 includes five link blocks preceding the user data blocks 24. The five link blocks consist of one link block 22 and four run-in blocks 23. The packet 21 further includes two link blocks subsequent to the user data blocks 24. The two link blocks consist of two run-out blocks 25. These link blocks are used for connecting the packets 21 to each other when information is recorded in the user data blocks 24 of the packets 21 in the track of the optical disc 11.

Figure 4:
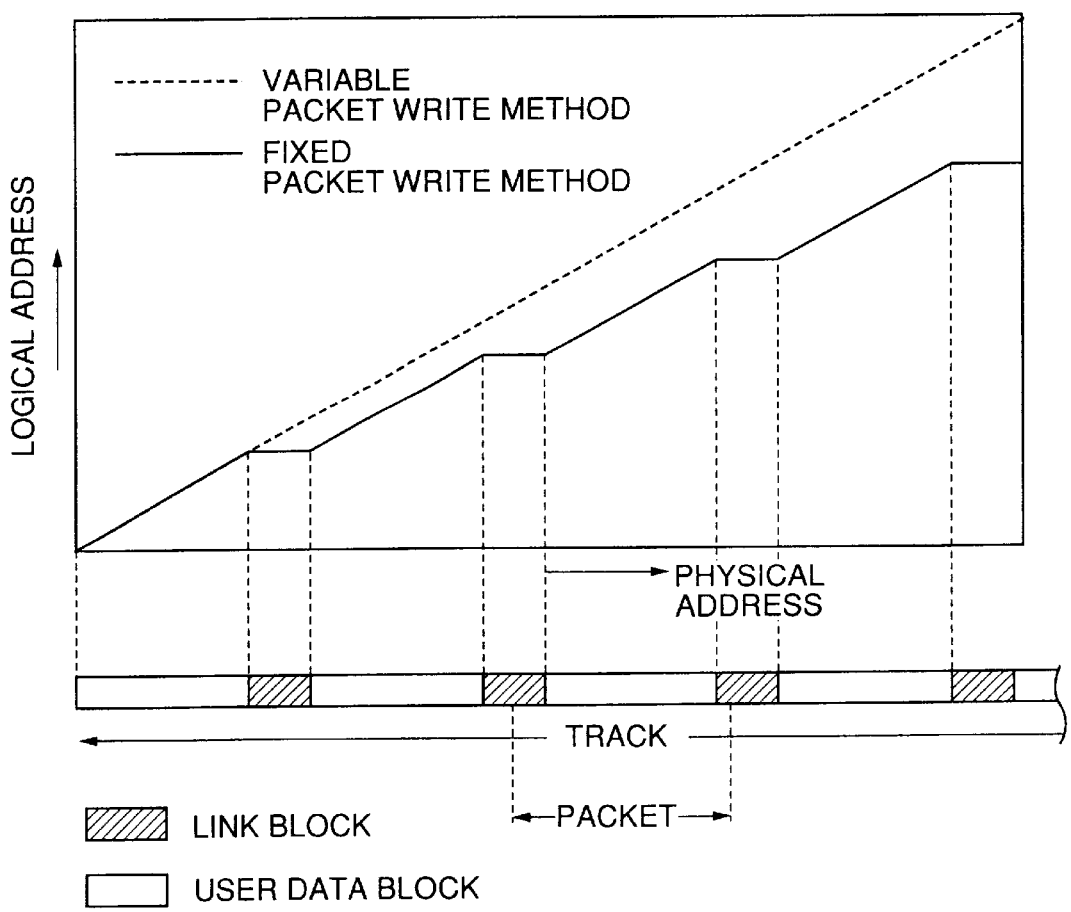
FIG. 4 is an illustration for explaining concepts of the fixed packet write method and a variable packet write method.

A description will now be given of a difference between the fixed packet write method and the variable packet write method. FIG. 4 is an illustration for explaining concepts of the fixed packet write method and the variable packet write method.

In the variable packet write method, since the logical addresses are assigned to even the link blocks, the logical addresses and the physical addresses are linearly related as indicated by a dashed line in FIG. 4. Thus, the logical addresses of user data blocks are not consecutive over separate packets.

On the other hand, in the fixed packet write method, the logical addresses are not assigned to the link blocks so that the user data blocks are consecutive over separate packets as indicated by a solid line in FIG. 4. Accordingly, in the fixed packet write method, there is no empty area in the logical address space. Thus, a reproducing operation for the information recorded on the optical disc can be performed without considering the packet structure.

Figure 5:
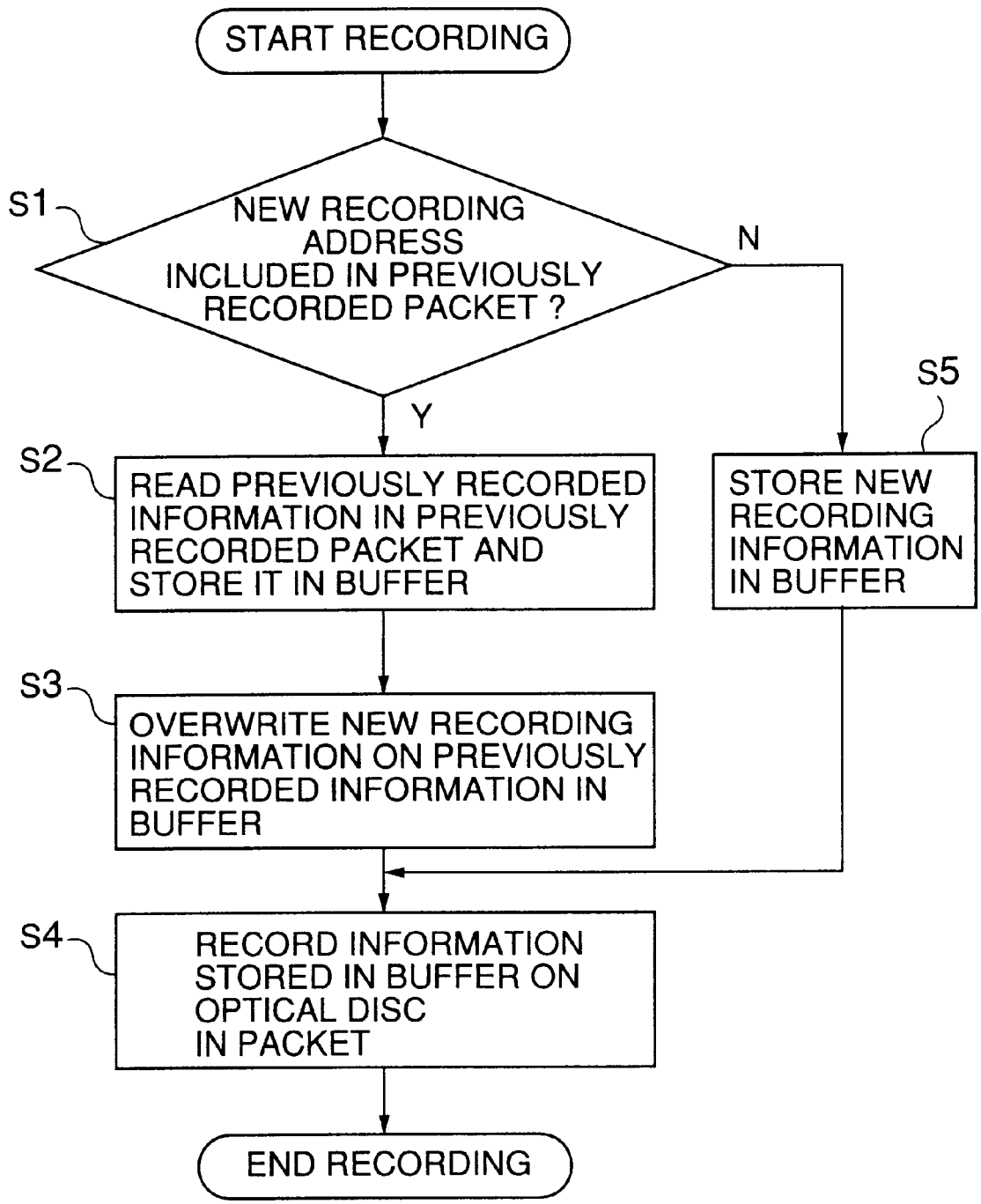
FIG. 5 is a flowchart of a process for recording information on an optical disc in the optical disc recording apparatus shown in FIG. 1.

A description will now be given of a process for recording new recording information on the optical disc 11 in the optical disc recording apparatus. FIG. 5 is a flowchart of the process for recording information on the optical disc 11 in the optical disc recording apparatus according to the first embodiment of the present invention.

When a recording is started, it is determined, in step S1, whether or not new recording addresses including a recording start address and a recording end address are included in a single previously recorded packet. The new recording addresses indicate a recording area of a packet in which the new recording information is to be recorded. If it is determined that the new recording addresses are not included in a single previously recorded packet, the routine proceeds to step S5 so as to store the new recording information in the buffer 8, and the routine proceeds to step S4. Then, in step S4, the new recording information in the buffer 8 is recorded in the new packet, and the routine is ended.

On the other hand, if it is determined, in step S1, that the new recording addresses are included in a single previously recorded packet, the routine proceeds to step S2. In step S2, the previously recorded information recorded in the previously recorded packet is read and stored in the buffer 8. In step S3, the previously recorded information in the buffer 8 is overwritten by the new recording information, and the routine proceeds to step S4. In step S4, the new recording information in the buffer 8 is recorded over the previously recorded information in the corresponding previously recorded packet, and the routine is ended.

As mentioned above, the previously recorded information including the new recording addresses is read and stored in the buffer 8. Then, the previously recorded information in the buffer 8 is overwritten by the new recording information. Thereafter, the information in the buffer 8 is recorded over the previously recorded information in the previously recorded packet from which the previously recorded information is read. Thus, a recording start address and a recording end address of the new recording information are not required to be set as a start address and an end address of the packet. Accordingly, the information in the packet can be rewritten for each individual block irrespective of a gap between adjacent packets.

Accordingly, information can randomly recorded on the optical disc by individual user data block the same way as in a reproducing operation without considering the packet structure of the optical disc.

Figure 6:
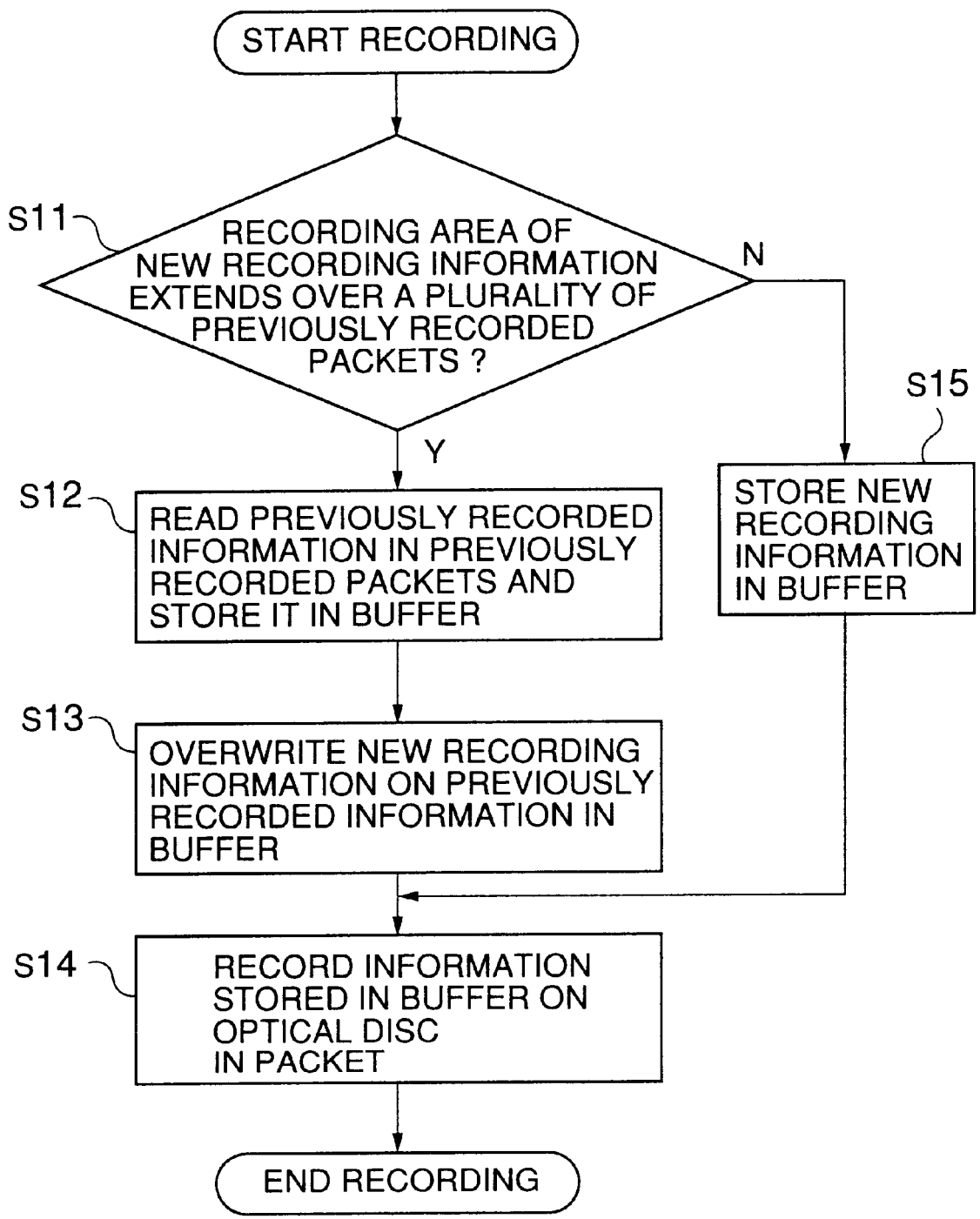
FIG. 6 is a flowchart of a process for recording new recording information extending over a plurality of previously recorded packets.

A description will now be given of a process for recording new recording information when the new recording information is to be recorded over a plurality of previously recorded packets in the recording area of the optical disc 11. FIG. 6 is a flowchart of the process for recording the new recording information over a plurality of previously recorded packets.

When a recording is started, it is determined, in step S11, whether or not a recording area for the new recording information extends over a plurality of previously recorded packets on the optical disc 11. If it is determined that the recording area of the new recording information does not extend over a plurality of previously recorded packets, the routine proceeds to step S15 so as to store the new recording information in the buffer 8, and the routine proceeds to step S14. Then, in step S14, the new recording information in the buffer 8 is recorded in the new packets, and the routine is ended.

On the other hand, if it is determined, in step S11, that the recording area of the new recording information does extend over a plurality of previously recorded packets, the routine proceeds to step S12. In step S12, the previously recorded information recorded in the previously recorded packets is read and stored in the buffer 8. In step S13, the previously recorded information in the buffer 8 is overwritten by the new recording information, and the routine proceeds to step S14. In step S14, the new recording information in the buffer 8 is recorded over the previously recorded information in the previously recorded packets from which the previously recorded information is read, and the routine is ended.

As mentioned above, the new recording information can be recorded on the optical disc 11 on an individual user data block basis even when the new recording information it to be recorded over a plurality of previously recorded packets.

Figure 7:
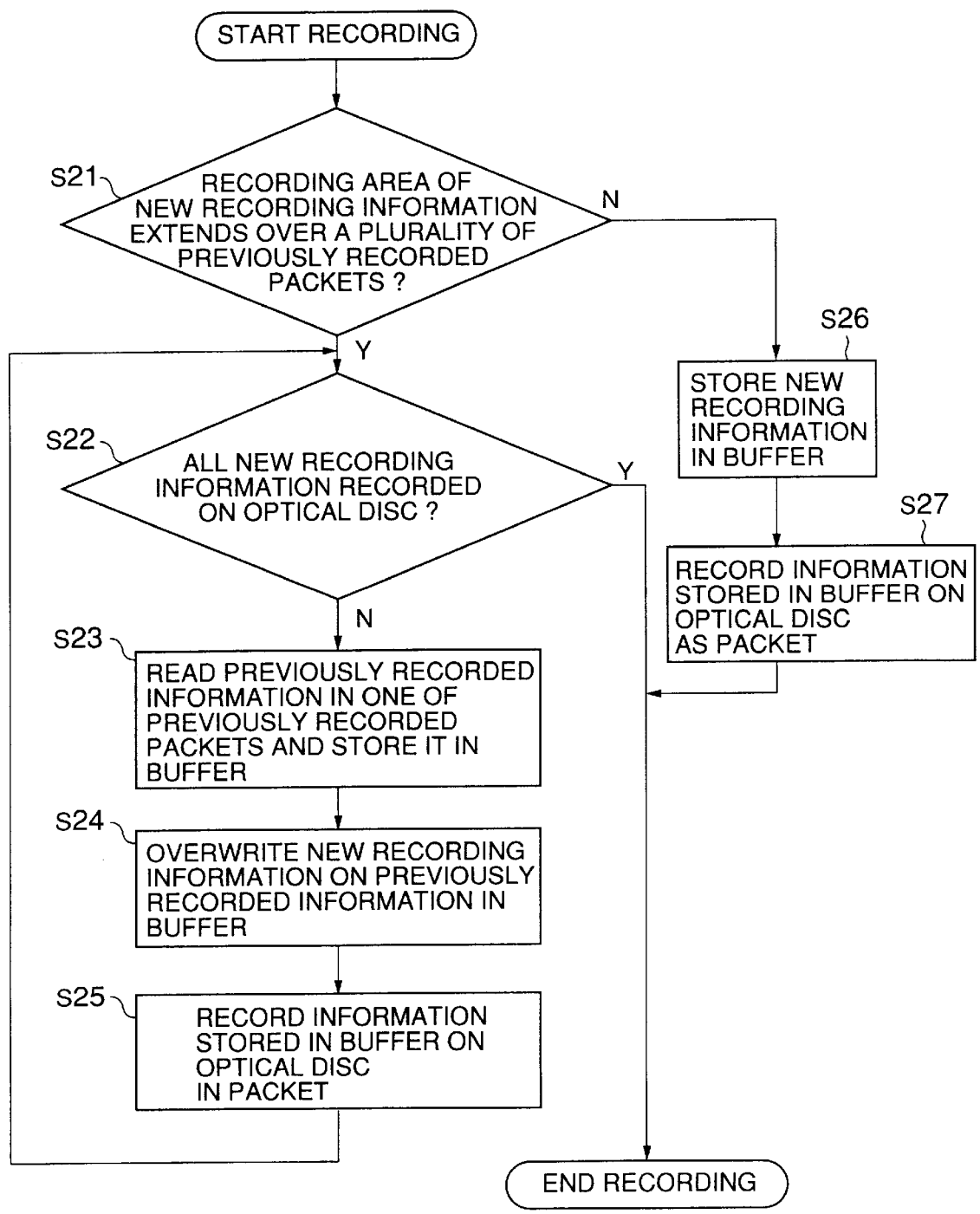
FIG. 7 is a flowchart of a process for recording new information extending over a plurality of previously recorded packets when an amount of the new information exceeds a capacity of a buffer.

A description will now be given of a process for recording new recording information when the new recording information is to be recorded over a plurality of previously recorded packets in the recording area of the optical disc 11 and the amount of the new recording information exceeds the capacity of the buffer 8. FIG. 7 is a flowchart of the process for recording the new information over a plurality of previously recorded packets when the amount of the new recording information exceeds the capacity of the buffer 8.

When a recording is started, it is determined, in step S21, whether or not a recording area for the new recording information extends over a plurality of previously recorded packets on the optical disc 11. If it is determined that the recording area of the new recording information does not extend over a plurality of previously recorded packets, the routine proceeds to step S26 so as to store the new recording information in the buffer 8, and the routine proceeds to step S27. Then, in step S27, the new recording information in the buffer 8 is recorded in the new packets, and the routine is ended.

On the other hand, if it is determined, in step S21, that the recording area of the new recording information does extend over a plurality of previously recorded packets, the previously recorded information recorded in the previously recorded packets is read and stored in the buffer 8. It is then determined, in step S22, whether or not a process for recording all the new recording information on the optical disc has been performed.

If it is determined, in step S22, that the process has not been performed, the routine proceeds to step S23. In step S23, the previously recorded information is read from one of the previously recorded packets and is stored in the buffer 8, and the routine proceeds to step S24. In step S24, the previously recorded information of the one of the previously recorded packets is overwritten by a part of the new recording information to be recorded in the one of the previously recorded packets, and the routine proceeds to step S25. In step S25, the part of the new recording information is read from the buffer 8 and is recorded over the previously recorded information in the one of the previously recorded packets. Then, the routine returns to step S22 so as to repeat the process of steps S22 to S25 until all the new information is written in the plurality of previously recorded packets.

As mentioned above, the new recording information can be recorded on the optical disc 11 on an individual block basis even when the new recording information is to be recorded over a plurality of previously recorded packets and an amount of the new recording information exceeds the capacity of the buffer 8.

Figure 8:
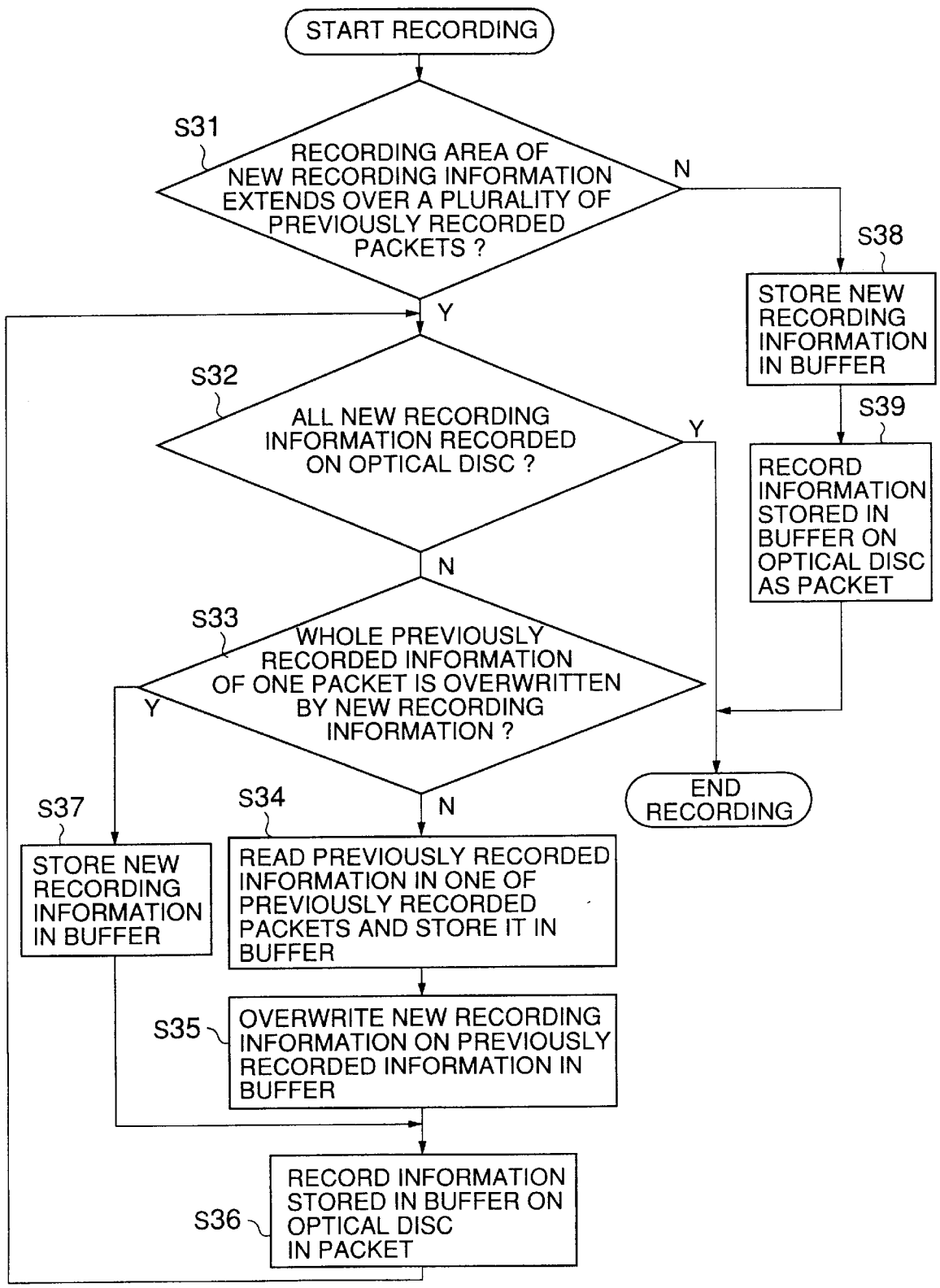
FIG. 8 is a flowchart of a process for recording new recording information by overwriting entire previously recorded information in a previously recorded packet.

A description will now be given of a process for recording new recording information when the previously recorded information in all previously recorded packets is to be totally overwritten by the new recording information. FIG. 8 is a flowchart of the process for recording the new recording information by overwriting the previously recorded information in all previously recorded packets.

When a recording is started, it is determined, in step S31, whether or not a recording area for the new recording information extends over a plurality of previously recorded packets on the optical disc 11. If it is determined that the recording area of the new recording information does not extends over a plurality of previously recorded packets, the routine proceeds to step S38 so as to store the new recording information in the buffer 8, and the routine proceeds to step S39. Then, in step S39, the new recording information in the buffer 8 is recorded in the new packets, and the routine is ended.

On the other hand, if it is determined, in step S31, that the recording area of the new recording information does extend over a plurality of previously recorded packets, the previously recorded information recorded in the previously recorded packets is read and stored in the buffer 8. It is then determined, in step S32, whether or not a process for recording all the new recording information on the optical disc has been performed.

If it is determined, in step S32, that the process has not been performed, the routine proceeds to step S33 so as to determine whether or not all previously recorded information of one packet is to be overwritten by the recording information. If it is determined that all previously recorded information is to be overwritten by the new recording information, the routine proceeds to step S37. In step S37, the new recording information is stored in the buffer 8, and the routine proceeds to step S36. In step S36, the new recording information in the buffer 8 is recorded over the previously recorded information in the corresponding previously recorded packets, and the routine returns to step S32.

On the other hand, if it is determined, in step S33, that all previously recorded information is not to be overwritten by the new recording information, the routine proceeds to step S34. In step S34, the previously recorded information is read from the one of the previously recorded packets and is stored in the buffer 8, and the routine proceeds to step S35. In step S35, the previously recorded information of the one of the previously recorded packets is overwritten by a part of the new recording information to be written in the one of the previously recorded packets, and the routine proceeds to step S36. In step S36, the part of the new recording information is read from the buffer 8 and is recorded over the previously recorded information in the one of the previously recorded packets, and the routine returns to step S32 so as to repeat the process of steps S32 to S37 until the new information to be recorded in all the previously recorded packets is written.

As mentioned above, the previously recorded information of the previously recorded packet which is to be totally overwritten by the new recording information is directly overwritten by the new recording information. Thus, a time for reading the previously recorded information in the previously recorded packet can be eliminated, resulting in speed up an overwriting operation.

For example, when the recording area of the new recording information extends over more than three consecutive packets and the recording area extends from a part of the first packet to a part of the last (third) packet, information in the first and last packets is overwritten by using the buffer and the middle (second) packet is directly overwritten. Accordingly, a time for reading the information in the middle packet and storing the information in the buffer can be eliminated. Thus, an overwriting operation can be performed in a relatively short time when the number of previously recorded packets storing information to be totally overwritten by the new recording information is large.

In many cases, information recorded on an optical disc is related to a file system. Such information includes a text of a file and management information of the file. When such file information is rewritten, the management information is rewritten as well as the text of the file. The management information includes common management information which should be rewritten every time the file is rewritten.

A packet including such common management information is more frequently rewritten as compared to other packets. Additionally, since the common management information has a smaller amount of information, there is no need to rewrite the entire packet. Thus, in many cases, when the common management information is rewritten, only information of a part of the packet should be changed.

When such common information is rewritten, the common management information in the packet is read and stored in the buffer. The stored information is updated by rewriting in the buffer, and the updated information is recorded in the same packet. When this operation is frequently performed, it takes a lot of time to read and store the information in the packet. Additionally, since only the packet storing the common management information is frequently written, a particular part of the optical disc corresponding to the packet storing the common management information is deteriorated.

In order to eliminate the above-mentioned problem, according to the present invention, information which is frequently rewritten is maintained in the buffer so as to overwrite such information in the buffer. The updated information may be recorded in the packet when a recording operation is performed for the optical disc or when an instruction is provided by a user so that the optical disc is not accessed every time the information is updated. This reduces a time for rewriting the information, and also deterioration of the recording medium can be prevented.

Figure 9:
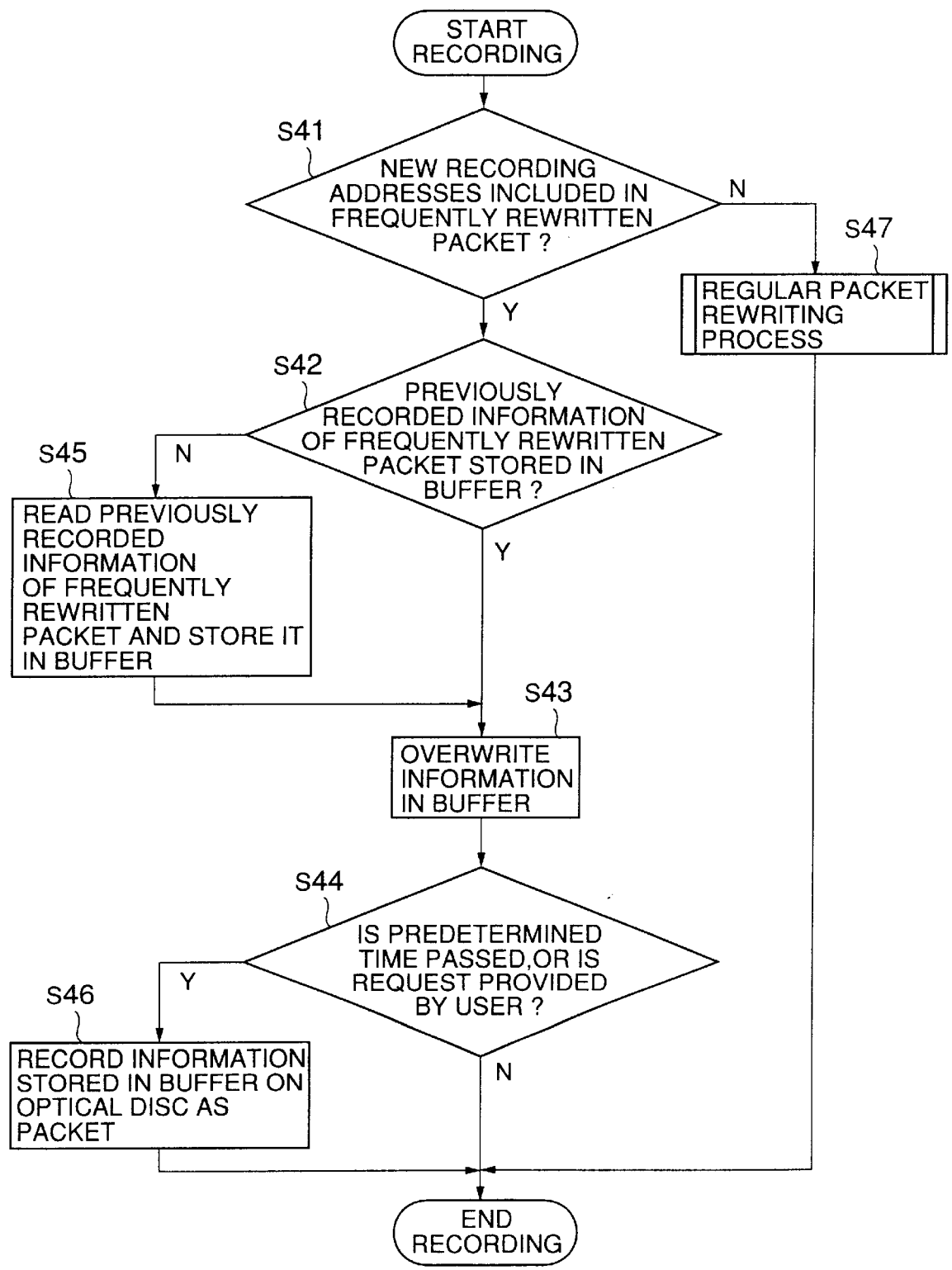
FIG. 9 is a flowchart of a process for recording information which is frequently updated.

A description will now be given of a process for recording information in a previously recorded packet of the optical disc 11, the information being frequently updated. FIG. 9 is a flowchart of the process for recording the information which is frequently updated.

When a recording operation is performed, it is determined, in step 41, whether or not new recording addresses of new recording information are included in a packet which is frequently overwritten, the new recording addresses including a start address and an end address of a recording area of the new recording information. If it is determined that the new recording addresses are not included in the frequently rewritten packet, the routine proceeds to step S47 so as to perform a regular process for rewriting a packet, and the routine is ended.

The regular operation for rewriting a packet may be the processes shown FIGS. 5 through 8 in which the new recording information is rewritten either by using or not using the buffer. The regular process is performed based on a previously determined procedure.

If it is determined, in step S41, that the new recording addresses are included in the frequently rewritten packet, the routine proceeds to step S42. In step S42, it is determined whether or not the previously recorded information of the frequently written packet is stored in the buffer 8. If it is determined that the previously recorded information is stored in the buffer 8, the routine proceeds to step S43. If it is determined that the previously recorded information is not stored in the buffer 8, the routine proceeds to step S45. In step S45, the previously recorded information of the frequently written packet is read and stored in the buffer 8, and the routine proceeds to step S43.

In step S43, the previously recorded information in the buffer 8 is overwritten by the new recording information. Then, it is determined, in step S44, whether or not a predetermined time period has passed after the information is overwritten, or whether or not a request for writing the information in the frequently written packet is provided by a user. If it is determined that the predetermined time period has not passed after the information is overwritten, or if it is determined that the request for writing the information in the frequently written recorded packet is not provided by a user, the routine is ended. On the other hand, if it is determined, in step S44, that the predetermined time period has passed after the information is overwritten, or the request for writing the information in the frequently written packet is provided by a user, the routine proceeds to step S46. In step S46, the new recording information in the buffer 8 is recorded over the previously recorded information in the previously recorded packet, and the routine is ended.

As mentioned above, when the optical disc is used, information that is frequently updated is maintained in the buffer 8 so that the information can be repeatedly updated in the buffer. The information in the buffer 8 is recorded over the previously recorded information in the frequently recorded packet when an instruction is provided by the user or when use of the optical disc is completed. Accordingly, there is no need to access the previously recorded information in the frequently rewritten packet each time the information in the buffer 8 is updated, resulting in saving time when updating the previously recorded information. Additionally, since the number of rewriting operations for the optical disc is reduced, deterioration of the recording medium can be prevented.

The present invention is not limited to the specifically disclosed embodiments, and variations and modifications may be made without departing from the scope of the present invention.

The present application is based on Japanese priority application No.9-105993 filed on Apr. 23, 1997, the entire contents of which are hereby incorporated by reference.

What is claimed is:

1. An optical disc recording apparatus for recording information on a rewritable optical disc by using a fixed length packet write method, a plurality of tracks having a plurality of packets being formed on a recording area of said optical disc, each of the packets having the same number of user data blocks, information being recorded at once on an individual packet basis, said optical disc recording apparatus comprising:

a buffer storing new recording information to be recorded on said optical disc;

a controller controlling a recording operation of the new recording information on said optical disc so that, when a recording area of the new recording information is totally included in a previously recorded packet, previously recorded information recorded in said previously recorded packet is read and stored in said buffer, the previously recorded information stored in said buffer is overwritten by the new recording information, and the new recording information in said buffer is recorded in said previously recorded packet.

2. An optical disc recording apparatus for recording information on a rewritable optical disc by using a fixed packet write method, a plurality of tracks having a plurality of packets being formed on a recording area of said optical disc, each of the packets having the same number of user data blocks, information being recorded at once on an individual packet basis, said optical disc recording apparatus comprising:

a buffer storing new recording information to be recorded on said optical disc;

a controller controlling a recording operation of the new recording information on said optical disc so that, when a recording area of the new recording information extends over a plurality of previously recorded packets, previously recorded information recorded in said plurality of said previously recorded packets is read and stored in said buffer, the previously recorded information stored in said buffer is overwritten by the new recording information, and the new recording information in said buffer is recorded in said previously recorded packet.

3. An optical disc recording apparatus for recording information on a rewritable optical disc by using a fixed packet write method, a plurality of tracks having a plurality of packets being formed on a recording area of said optical disc, each of the packets having the same number of user data blocks, information being recorded at once on an individual packet basis, said optical disc recording apparatus comprising:

a buffer storing new recording information to be recorded on said optical disc;

a controller controlling a recording operation of the new recording information on said optical disc so that, when a recording area of the new recording information extends over a plurality of previously recorded packets, previously recorded information in said previously recorded packets is read and stored in said buffer on an individual packet basis, the previously recorded information stored in said buffer is overwritten by a corresponding part of the new recording information immediately after the previously recorded information of one of said previously recorded packets is stored in said buffer, and the part of the new recording information stored in said buffer is recorded in said one of said previously recorded packets immediately after the previously recorded information of said one of said previously recorded packets is overwritten by the part of the new recording information.

4. The optical disc recording apparatus as claimed in claim 3, wherein said controller controls so as to directly overwrite the previously recorded information of said one of said previously recorded packets by the part of the new recording information, when the previously recorded information of said one of said previously recorded packets is totally overwritten by the part of the new recording information, so that an overwriting operation is performed on said optical disc without using said buffer.

* * * * *